US009124961B2

(12) United States Patent
Lee et al.

(10) Patent No.: US 9,124,961 B2
(45) Date of Patent: Sep. 1, 2015

(54) CONTROL DEVICE FOR DRIVING MULTI-FUNCTION SPEAKER BY USING DIGITAL MIXING SCHEME AND RELATED CONTROL METHOD THEREOF

(75) Inventors: Po-Yi Lee, New Taipei (TW); Sung-Han Wen, Taipei (TW); Chien-Chung Yang, Kaohsiung (TW)

(73) Assignee: MEDIATEK INC., Science-Based Industrial Park, Hsin-Chu (TW)

(*) Notice: Subject to any disclaimer, the term of this patent is extended or adjusted under 35 U.S.C. 154(b) by 372 days.

(21) Appl. No.: 13/334,059

(22) Filed: Dec. 22, 2011

(65) Prior Publication Data

US 2013/0016855 A1 Jan. 17, 2013

Related U.S. Application Data

(60) Provisional application No. 61/508,507, filed on Jul. 15, 2011.

(51) Int. Cl.
*H04B 1/00* (2006.01)
*H04R 3/00* (2006.01)
*H04H 60/04* (2008.01)

(52) U.S. Cl.
CPC . *H04R 3/00* (2013.01); *H04H 60/04* (2013.01)

(58) Field of Classification Search
CPC ........... H04R 2430/25; H04R 2430/03; H04R 2430/01; H04R 2420/01; H04R 2400/13; H04R 2400/03; H04R 2400/07; H04R 5/04; H04R 5/02; H04R 3/04; H04R 3/06; H04R 3/08; H04R 1/227; H04R 1/02; H04R 1/021; H04R 1/028
USPC ......... 381/7, 13, 308, 311, 28, 59, 61, 62, 63, 381/71.2, 162, 164, 191, 71.9, 71.11, 71.12, 381/71.14, 80, 83, 84, 85, 86, 89, 332, 334, 381/93, 94.2, 94.3, 94.8, 94.9, 97, 98, 100, 381/101, 103, 119, 120, 121, 150, 55; 700/94
See application file for complete search history.

(56) References Cited

U.S. PATENT DOCUMENTS

| | | | | |
|---|---|---|---|---|
| 4,641,361 | A * | 2/1987 | Rosback | 381/103 |
| 8,156,809 | B2 | 4/2012 | Tierling | |
| 2005/0047621 | A1 * | 3/2005 | Cranfill et al. | 381/334 |
| 2008/0240484 | A1 * | 10/2008 | Tanghe et al. | 381/370 |
| 2010/0061569 | A1 * | 3/2010 | Kamatori et al. | 381/119 |
| 2012/0063632 | A1 | 3/2012 | Aoki | |

* cited by examiner

*Primary Examiner* — Leshui Zhang
(74) *Attorney, Agent, or Firm* — Winston Hsu; Scott Margo

(57) ABSTRACT

A control device and an associated method for driving a multi-function speaker supporting a plurality of predetermined functions including at least an audio function and a non-audio function includes a digital signal mixing block and a digital-to-analog block. The digital signal mixing block is arranged for receiving a plurality of digital input signals corresponding to the predetermined functions, respectively, and generating a digital mixed signal according to the digital input signals. The digital-to-analog block is coupled to the digital signal mixing block, for generating an analog driving signal to the multi-function speaker according to the digital mixed signal.

8 Claims, 11 Drawing Sheets

CONTROL DEVICE FOR DRIVING MULTI-FUNCTION SPEAKER BY USING DIGITAL MIXING SCHEME AND RELATED CONTROL METHOD THEREOF

CROSS REFERENCE TO RELATED APPLICATIONS

This application claims the benefit of U.S. provisional application No. 61/508,507, filed on Jul. 15, 2011 and incorporated herein by reference.

BACKGROUND

The disclosed embodiments of the present invention relate to driving a speaker, and more particularly, to a control device for driving a multi-function speaker by using a digital mixing scheme and related control method thereof.

The conventional multi-function speaker includes "2-in-1 Speaker" and "3-in-1 Speaker". The functions supported by the multi-function speaker may include audio playback, voice playback, and vibration. Due to its low cost and compact size, the multi-function speaker is widely used in modern communications appliances.

Please refer to FIG. 1, which is a block diagram illustrating a traditional control device for driving a conventional vibration speaker. The vibration speaker 101 shown in FIG. 1 is also called a "2-in-1 speaker", which is a kind of multi-function speaker that only supports two functions, including audio playback and vibration. The control device 100 employs an analog mixing scheme to mix two analog signal sources with different frequencies (one is for audio playback, and the other is for vibration), and uses the mixed signal to drive the vibration speaker 101. For example, the audio signal may be in a frequency band of 200 Hz-20 kHz, and the vibration signal may be a sinusoidal signal in a frequency band of 100 Hz-200 Hz.

The circuit elements included in the control device 100 are analog devices. That is, an analog high-pass filter (HPF) 114, an analog mixer 116, and an analog amplifier (Amp) 118 are used. As shown in FIG. 1, the audio signal needs to pass through the high order high-pass filter (HPF) 114 in order to remove the low-frequency components included therein. However, the high order high-pass filter (HPF) 114 realized in the analog domain comes with a high cost and cannot be dynamically turned on/off, resulting in degradation in low-frequency performance for the audio signal. Moreover, the audio signal may suffer from signal quality degradation due to passing through the analog mixer 116, resulting in noise and nonlinear distortion present in the filtered audio signal.

As for the vibration signal, most systems in the communications appliances are not equipped with an internal signal source for providing the desired vibration signal, thus requiring an extra processor (e.g., baseband processor) to create a periodical pulse width modulation (PWM) signal to generate such a signal, and also requiring an extra low-pass filter (LPF) 112 to remove the high-frequency components. This inevitably increases hardware costs. In addition, regarding mass production, multi-function speakers often possess vibration point variation during the manufacturing process, which may lead to inconsistent vibrations.

Thus, there is a need for an innovative control device to improve the overall performance of a multi-function speaker.

SUMMARY

In accordance with exemplary embodiments of the present invention, a control device for driving a multi-function speaker by using a digital mixing scheme and related control method thereof are proposed to solve the above-mentioned problem.

According to a first aspect of the present invention, an exemplary control device for driving a multi-function speaker supporting a plurality of predetermined functions including at least an audio function and a non-audio function is disclosed. The control device includes a digital signal mixing block and a digital-to-analog block. The digital signal mixing block is arranged for receiving a plurality of digital input signals respectively corresponding to the predetermined functions and generating a digital mixed signal according to the digital input signals. The digital-to-analog block is coupled to the digital signal mixing block, and used for generating an analog driving signal to the multi-function speaker according to the digital mixed signal.

According to a second aspect of the present invention, an exemplary control method for driving a multi-function speaker supporting a plurality of predetermined functions including at least an audio function and a non-audio function is disclosed. The control method includes receiving a plurality of digital input signals respectively corresponding to the predetermined functionsand generating a digital mixed signal according to the digital input signals; and generating an analog driving signal to the multi-function speaker according to the digital mixed signal.

According to a third aspect of the present invention, an exemplary control device for driving a multi-function speaker supporting a plurality of predetermined functions including at least an audio function and a non-audio function, the control device comprises a digital signal mixing block, a digital-to-analog block and a detection circuit. The digital signal mixing block comprises a plurality of signal processing blocks and a mixer, wherein the signal processing blocks are used for receiving a plurality of digital input signals corresponding to the predetermined functions respectively to generate a plurality of digital processed signals by processing the digital input signals respectively, and the mixer is used for generating a digital mixed signal by mixing the digital processed signals; The digital-to-analog block is coupled to the digital signal mixing block for generating an analog driving signal to the multi-function speaker according to the digital mixed signal; and the detection circuit is coupled to the digital signal mixing block and the digital-to-analog block for detecting the analog driving signal to generate a detection result, and selectively controlling the digital signal mixing block to adjust at least one of the digital processed signals according to the detection result.

According to a fourth aspect of the present invention, an exemplary control method for a multi-function speaker supporting a plurality of predetermined functions including at least an audio function and a non-audio function, the control method comprising receiving a plurality of digital input signals corresponding to the predetermined functions, respectively; generating a plurality of digital processed signals by processing the digital input signals respectively; generating a digital mixed signal by mixing the digital processed signals; generating an analog driving signal to the multi-function speaker according to the digital mixed signal; detecting the analog driving signal to generate a detection result; and selectively adjusting at least one of the digital processed signals according to the detection result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

A concept of the present invention is to perform mixing and/or digital signal processing. For example, an audio signal and a vibration signal can be mixed using a digital mixer. Since this mixing operation is substantially digital addition/combination, it will not suffer from noise and distortion. Besides, a high order high-pass filter and/or low-pass filter can be realized in the digital domain with relatively low cost. Further details are described as below.

Figure 1:
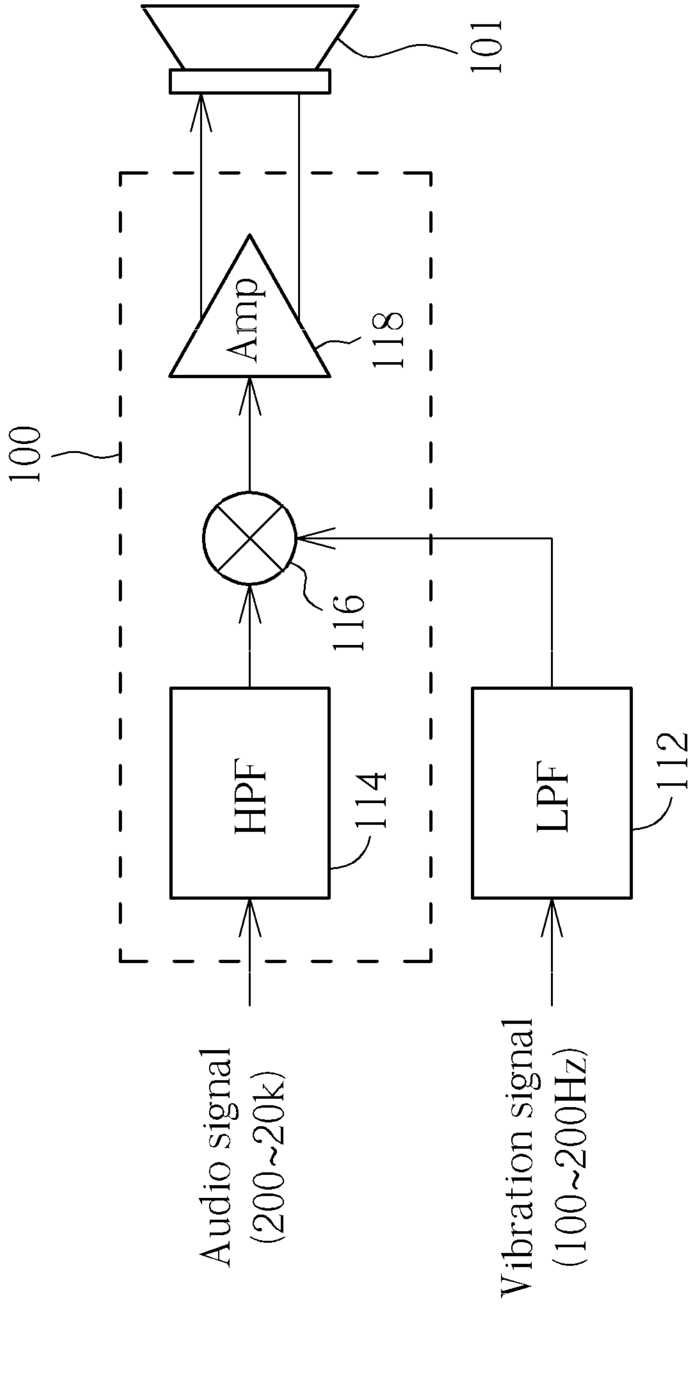
FIG. 1 PRIOR ART
FIG. 1 is a block diagram illustrating a traditional control device for driving a conventional vibration speaker.
Figure 2:
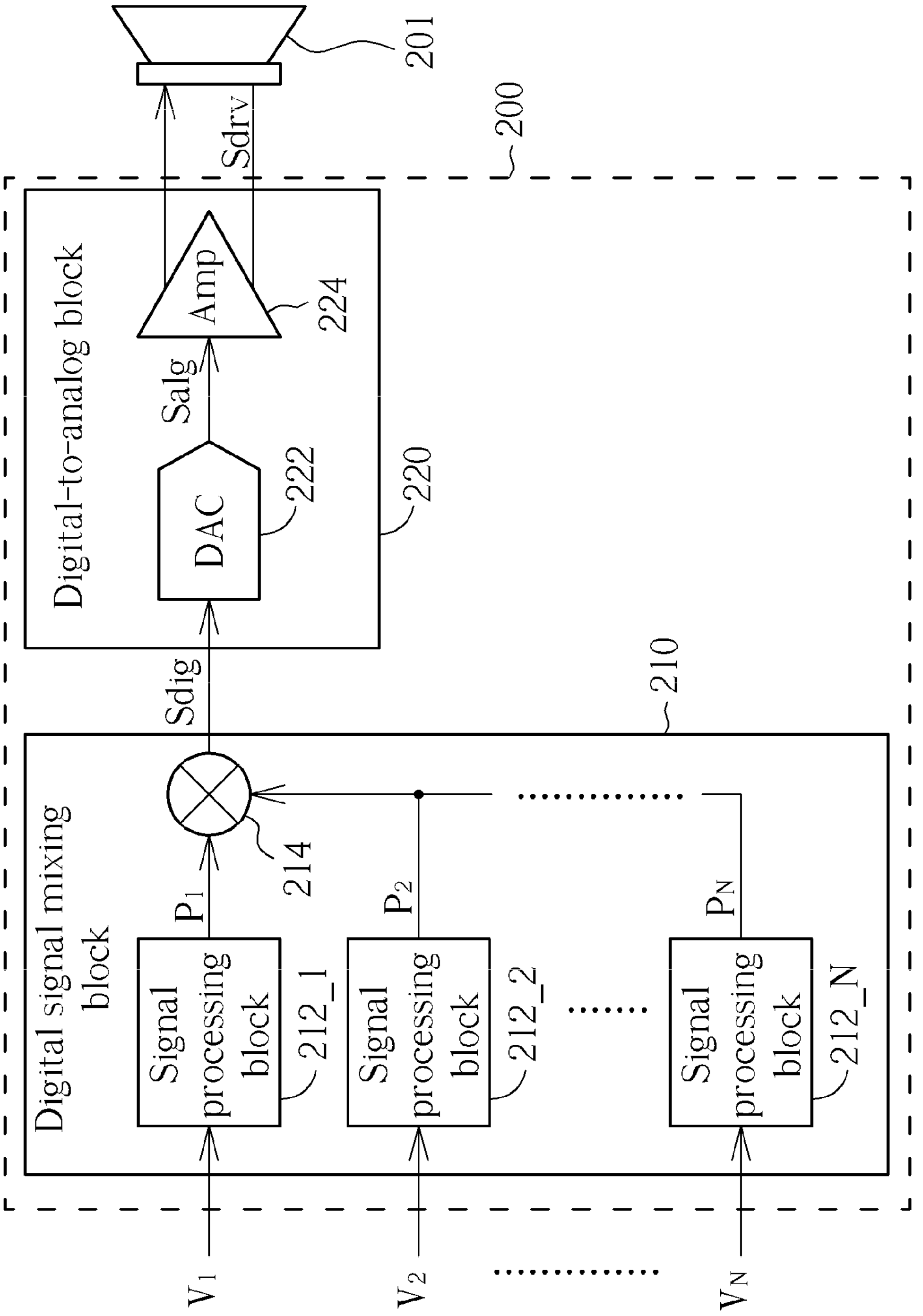
FIG. 2 is a block diagram illustrating a control device for driving a multi-function speaker according to a first exemplary embodiment of the present invention.

Please refer to FIG. 2, which is a block diagram illustrating a control device for driving a multi-function speaker according to a first exemplary embodiment of the present invention. The multi-function speaker 201 supports a plurality of predetermined functions including at least an audio function and a non-audio function. For example, the multi-function speaker 201 may be a vibration speaker, where one supported audio function is to perform playback of an audio file, and one supported non-audio function is to generate vibration. The exemplary control device 200 includes, but is not limited to, a digital signal mixing block 210 and a digital-to-analog block 220. The digital signal mixing block 210 is arranged for receiving a plurality of digital input signals $V_1$-$V_N$ ($N \geq 2$) corresponding to the predetermined functions, respectively, and generating a digital mixed signal $S_{dig}$ according to the digital input signals $V_1$-$V_N$. The digital-to-analog block 220 is coupled to the digital signal mixing block 210, and arranged for generating an analog driving signal $S_{drv}$ to the multi-function speaker 201 according to the digital mixed signal $S_{dig}$.

In one exemplary design, the digital signal mixing block 210 includes, but is not limited to, a plurality of signal processing blocks 212_1-212_N and a mixer 214. It should be noted that the circuit elements included in the digital signal mixing block 210 are all digital components operated in the digital domain. The digital-to-analog block 220 includes, but is not limited to, a digital-to-analog converter (DAC) 222 and an amplifier (Amp) 224. The signal processing blocks 212_1-212_N are arranged for generating a plurality of digital processed signals $P_1$-$P_N$ by processing the digital input signals $V_1$-$V_N$, respectively.

The mixer 214 is a digital mixer arranged for generating the digital mixed signal $S_{dig}$ by mixing the digital processed signals $P_1$-$P_N$. The digital-to-analog converter (DAC) 222 is arranged for converting the digital mixed signal $S_{dig}$ in the digital domain into an analog mixed signal $S_{alg}$ in the analog domain. The amplifier (Amp) 224 is an analog amplifier coupled to the digital-to-analog converter (DAC) 222, and is arranged for generating the analog driving signal $S_{drv}$ by amplifying the analog mixed signal $S_{alg}$. The digital processed signals $P_1$-$P_N$ match a plurality of electronic characteristics (e.g., frequency responses) of the multi-function speaker 201 corresponding to the predetermined functions, respectively. However, this is for illustrative purposes only, and is not meant to be a limitation of the present invention. The conception of the present invention may be applied to any application which utilizes frequencies, phases, power levels, current levels or voltage levels of the digital processed signals $P_1$-$P_N$ for driving a multi-function speaker 201 to perform different supported functions, respectively. These alternative designs all fall within the scope of the present invention.

Figure 3:
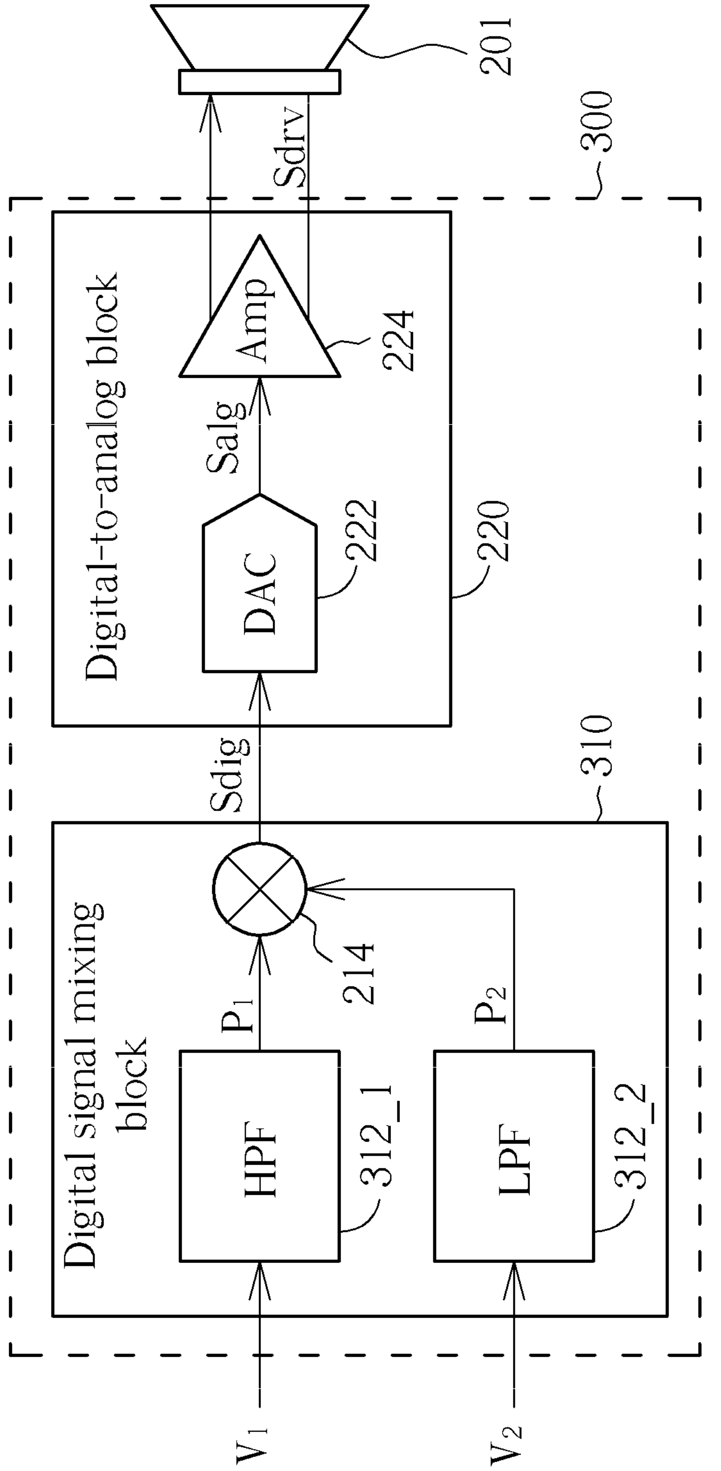
FIG. 3 is a block diagram illustrating an exemplary implementation of a control device based on a circuit structure shown in FIG. 2.

Please refer to FIG. 3, which is a block diagram illustrating an exemplary implementation of a control device based on the circuit structure shown in FIG. 2. In this exemplary design, the control device 300 is implemented for driving a multi-function speaker 201, and the digital signal mixing block 310 has two signal processing blocks including a high-pass filter (HPF) 312_1 and a low-pass filter (LPF) 312_2. Due to the use of the high-pass filter (HPF) 312_1, the digital signal mixing block 310 removes low-frequency components from the audio signal $V_1$ to avoid unintentionally vibrating the multi-function speaker 201. Similarly, due to the use of the low-pass filter (LPF) 312_2, the digital signal mixing block 310 removes high-frequency components from the vibration signal $V_2$ to avoid the multi-function speaker 201 accidentally generating sound.

Figure 4A:
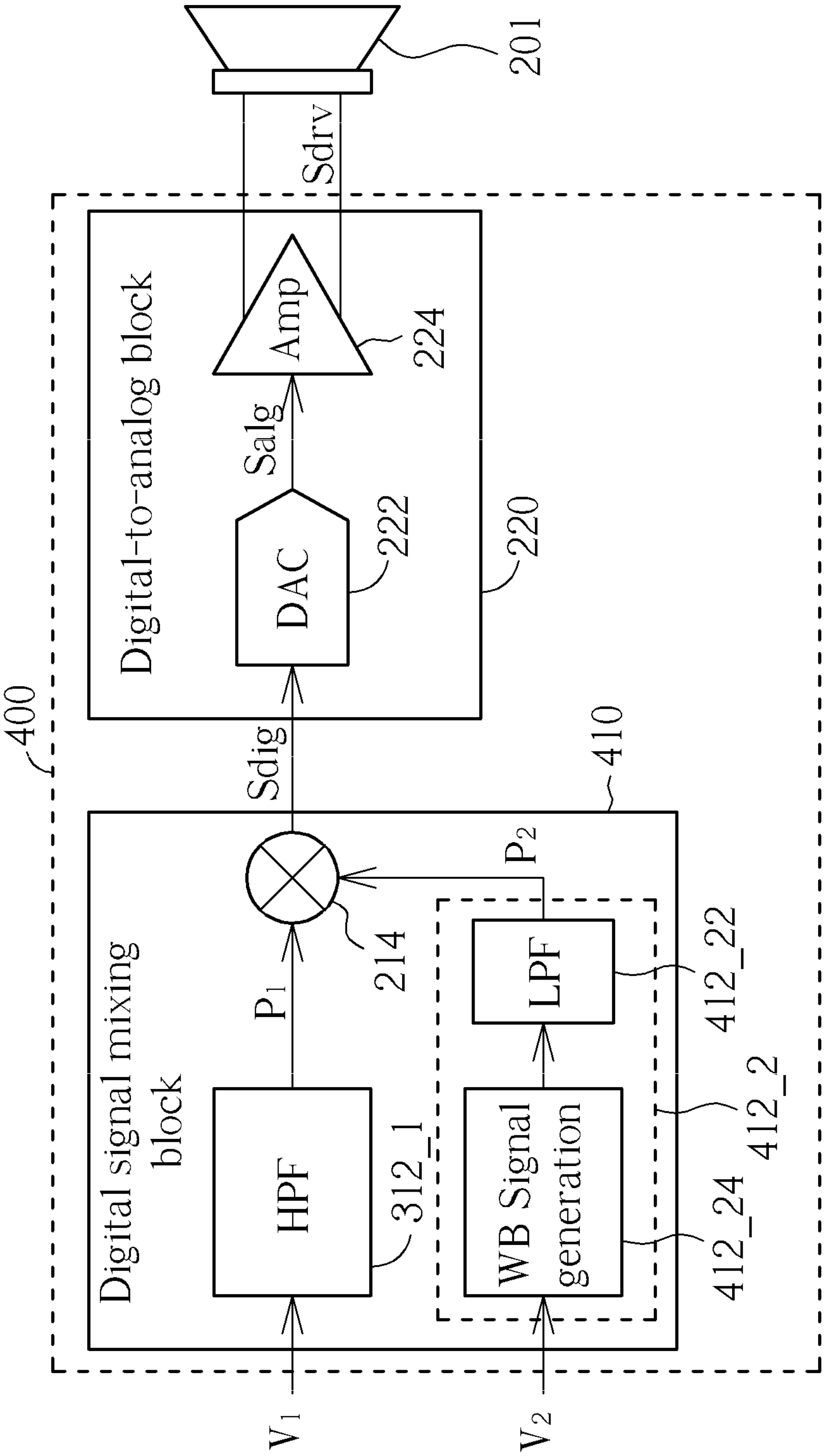
FIG. 4A is a block diagram illustrating another exemplary implementation of a control device based on the circuit structure shown in FIG. 2.

Please refer to FIG. 4A, which is a block diagram illustrating another exemplary implementation of a control device based on the circuit structure shown in FIG. 2. In this example, the control device 400 is implemented for driving the multi-function speaker 201, and the digital signal mixing block 410 has the aforementioned high-pass filter (HPF) 312_1 acting as one signal processing block and a signal processing block 412_2 including a low-pass filter (LPF) 412_22 and a wideband (WB) signal generation block 412_24.

Figure 4B:
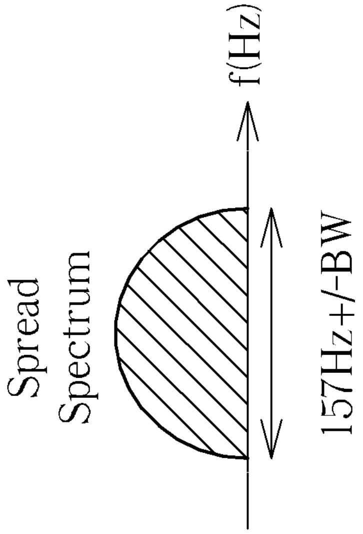
FIG. 4B is a schematic diagram illustrating a spread spectrum method.
Figure 4C:
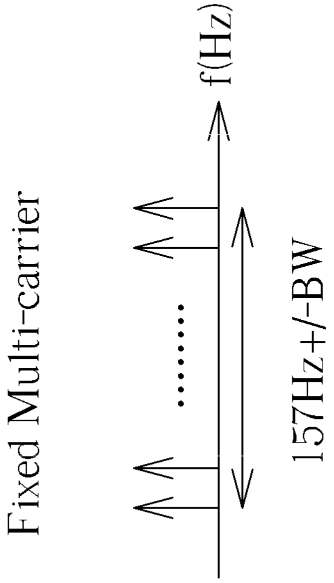
FIG. 4C is a schematic diagram illustrating a fixed multi-carriers method.

As mentioned above, the high-pass filter (HPF) 312_1 can remove low-frequency components from the audio signal $V_1$ to avoid unintentionally vibrating the multi-function speaker 201. The wideband (WB) signal generation block 412_24 converts the narrowband vibration signal $V_2$ into a wideband signal to evenly distribute the power of the vibration signal $V_2$ in order to address the inconsistent vibration problem caused by vibration point variation. By way of example, but not limitation, the wideband (WB) signal generation block 412_24 may employ a "spread spectrum" method or a "fixed multi-carriers" method. Please refer to FIG. 4B and FIG. 4C, FIG. 4B is a schematic diagram illustrating a spread spectrum method and FIG. 4C is a schematic diagram illustrating a fixed multi-carriers method. In FIG. 4B, a spread-spectrum signal centered at 157 Hz is generated by employing a frequency modulator to obtain the wideband signal. In FIG. 4C, a plurality of fix-toned signal are generated and evenly distributed over the frequency band to obtain the wideband signal. The low-pass filter (LPF) 412_22 removes high-frequency components from the vibration signal $V_2$ to avoid unintentionally causing the multi-function speaker 201 to generating sounds. Please note that, the vibration signal $V_2$ may be converted before or after being filtered. In other words, the coupling order of the low-pass filter (LPF) 412_22 and the wideband (WB) signal generation block 412_24 is adjustable.

In an alternative design, the present invention may employ a closed-loop solution to address the vibration point variation problem. Please refer to FIG. 5, which is a block diagram illustrating a control device for driving a multi-function speaker according to a second exemplary embodiment of the present invention. The exemplary control device 500 is similar to the control device shown in FIG. 2. One major difference between the control devices 200 and 500 is that the control device 500 further includes a detection circuit 530. The detection circuit 530 is coupled to the digital signal mixing block 210 and the digital-to-analog block 220, and is arranged for detecting/monitoring the analog driving signal Sdry to generate a detection result, and selectively controlling the digital signal mixing block 210 to adjust at least one of the digital processed signals $P_1$-$P_N$ according to the detection result. For example, the detection circuit 530 detects a certain physical quality (e.g., power loss or vibration levels) of the multi-function speaker 201 by checking the driving signal Sdry generated to the multi-function speaker 201, and sends back a control signal $S_c$ to the signal processing blocks 212_1-212_N. The signal processing blocks 212$_{\_1\text{-}212}$_N may adjust the digital processed signals $P_1$-$P_N$ in response to the control signal $S_c$ (e.g., increase vibration levels or reduce output power to protect the multi-function speaker 201).

Figure 5:
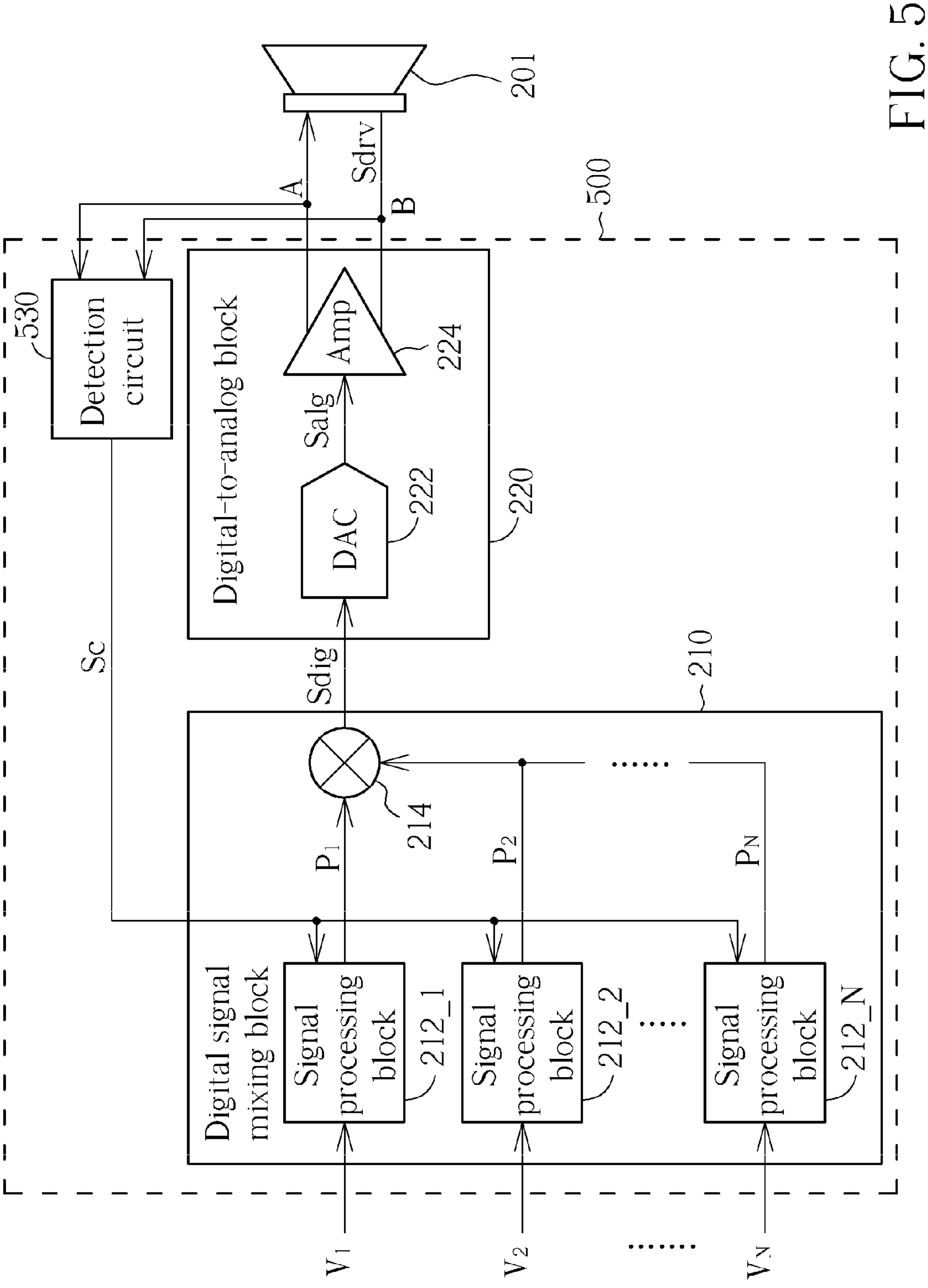
FIG. 5 is a block diagram illustrating a control device for driving a multi-function speaker according to a second exemplary embodiment of the present invention.
Figure 6A:
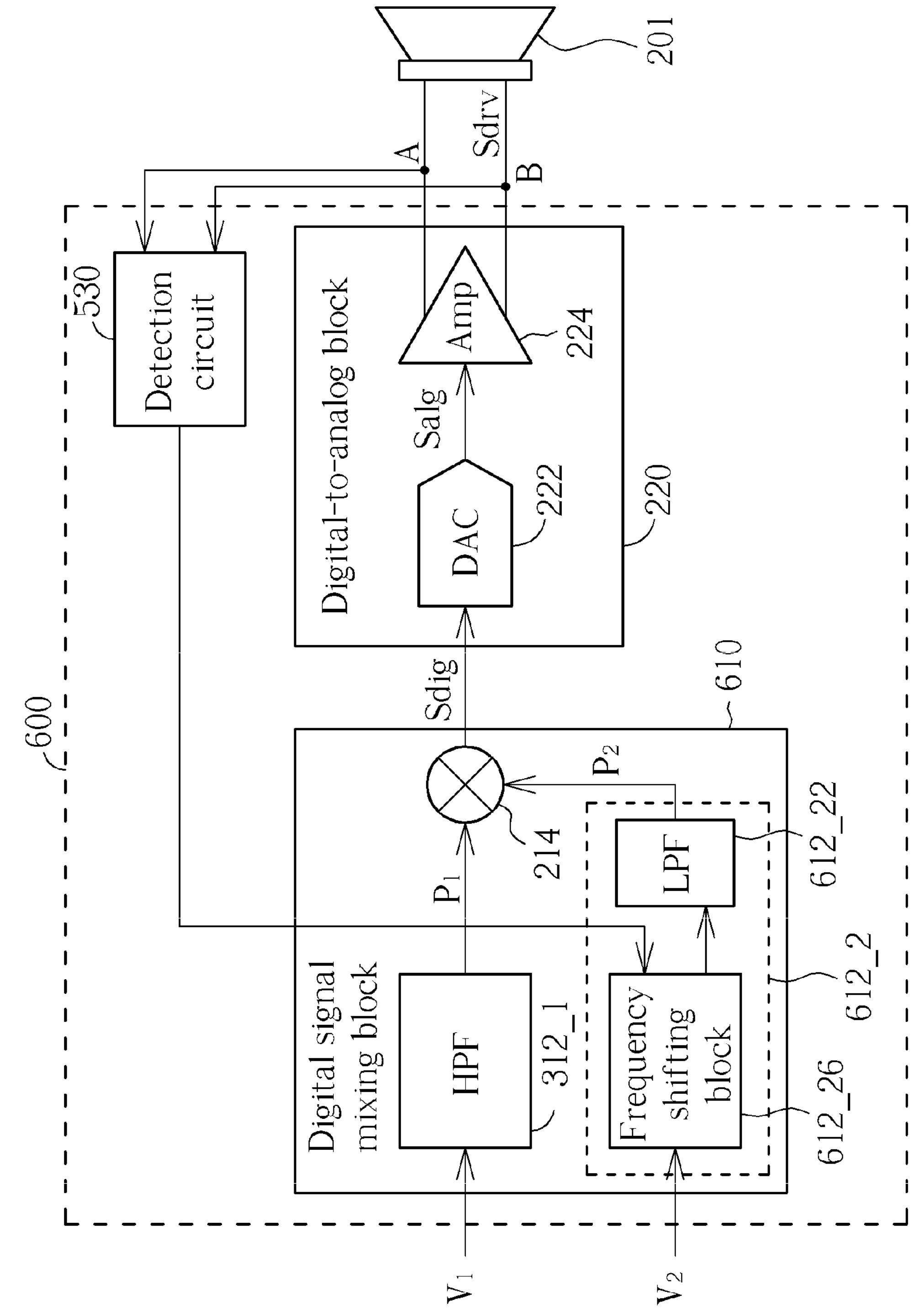
FIG. 6A is a block diagram illustrating an exemplary implementation of a control device based on a circuit structure shown in FIG. 5.

Please refer to FIG. 6A, which is a block diagram illustrating an exemplary implementation of a control device based on the circuit structure shown in FIG. 5. The control device 600 is implemented for driving the multi-function speaker 201, and the digital signal mixing block 610 includes the aforementioned high-pass filter (HPF) 312_1 acting as one signal processing block, and a signal processing block 612_2 including a low-pass filter (LPF) 612_22 and a frequency shifting block 612_26. If the detection circuit 530 detects that the vibration frequency of the vibration signal $V_2$ is lower than the vibration point of the multi-function speaker 201, the detection circuit 530 will send a level-up signal to the frequency shifting block 612_26.

Next, the frequency shifting block 612_26 pulls up the frequency of the vibration signal $V_2$ to approach the desired vibration point. On the other hand, if the detection circuit 530 detects that the vibration frequency of the vibration signal $V_2$ is higher than the vibration point of the multi-function speaker 201, the detection circuit 530 will send a level-down signal to the frequency shifting block 612_26.

Next, the frequency shifting block 612_26 pulls down the frequency of the vibration signal $V_2$ to approach the desired vibration point. In this way, the frequency deviation of the vibration signal $V_2$ may be mitigated by the detection circuit 530. Please note that, the frequency of the vibration signal $V_2$ can be shifted before or after being filtered. In other words, the coupling order of the low-pass filter (LPF) 612_22 and the frequency shifting block 612_26 is adjustable. By way of example, but not limitation, the detection circuit 530 may be realized by the circuit shown in FIG. 6B or FIG. 6C.

Figure 6B:
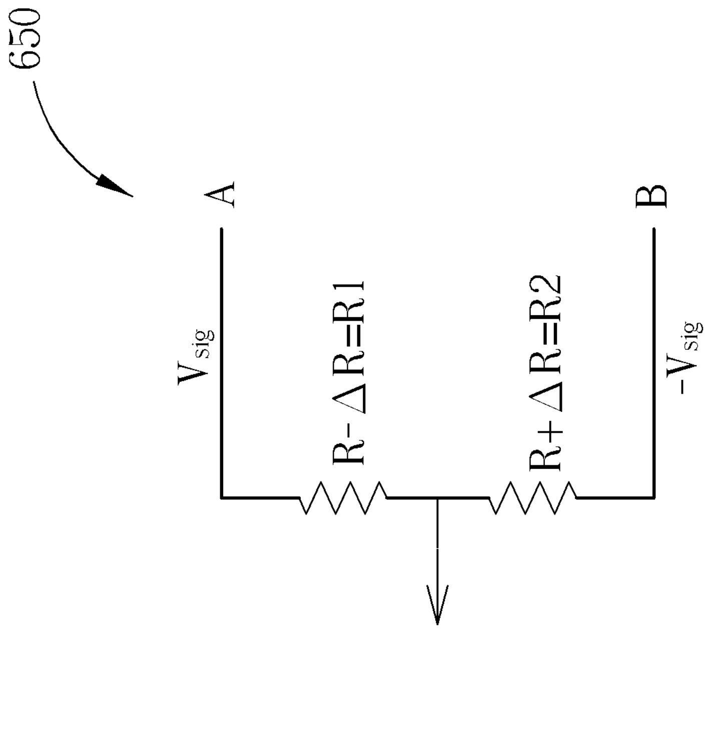
FIG. 6B is a block diagram illustrating an example of a voltage-sense detection circuit.
Figure 6C:
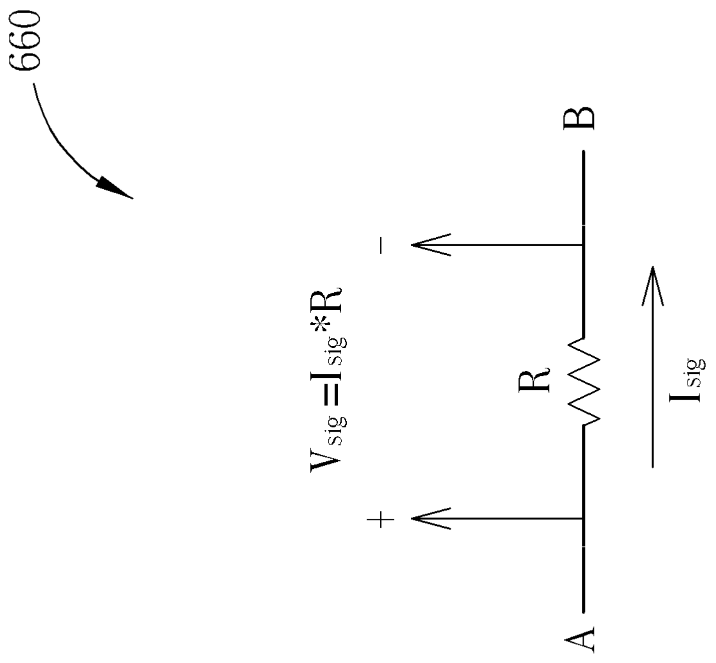
FIG. 6C is a block diagram illustrating an example of a current-sense detection circuit.

FIG. 6B is a block diagram illustrating an example of a voltage-sense detection circuit. FIG. 6C is a block diagram illustrating an example of a current-sense detection circuit. The voltage-sense detection circuit 650 can detect the level of the signal $V_{sig}$ by utilizing a pair of different resistances R1 and R2. The current-sense detection circuit 660 can detect the level of the signal $Isi_g$ by utilizing the coupled resistance R. With the information provided by the signal $V_{sig}$ and $I_{sig}$, the occurrence of the frequency of the vibration signal deviated from the desired vibration point can be detected. If the frequency of the vibration signal is deviated from the vibration point, the vibration level decreases and so does the power (root mean square of $V_{sig}$*root mean square of $I_{sig}$) inputted into the multi-function speaker. That is, in a case where $V_{sig}$ is the same, if the $I_{sig}$ decreases, the detection circuit 530 will adjust the vibration frequency of the vibration signal to the vibration point of the multi-function speaker 201, where the power inputted into the multi-function speaker is a maximum.

Figure 7:
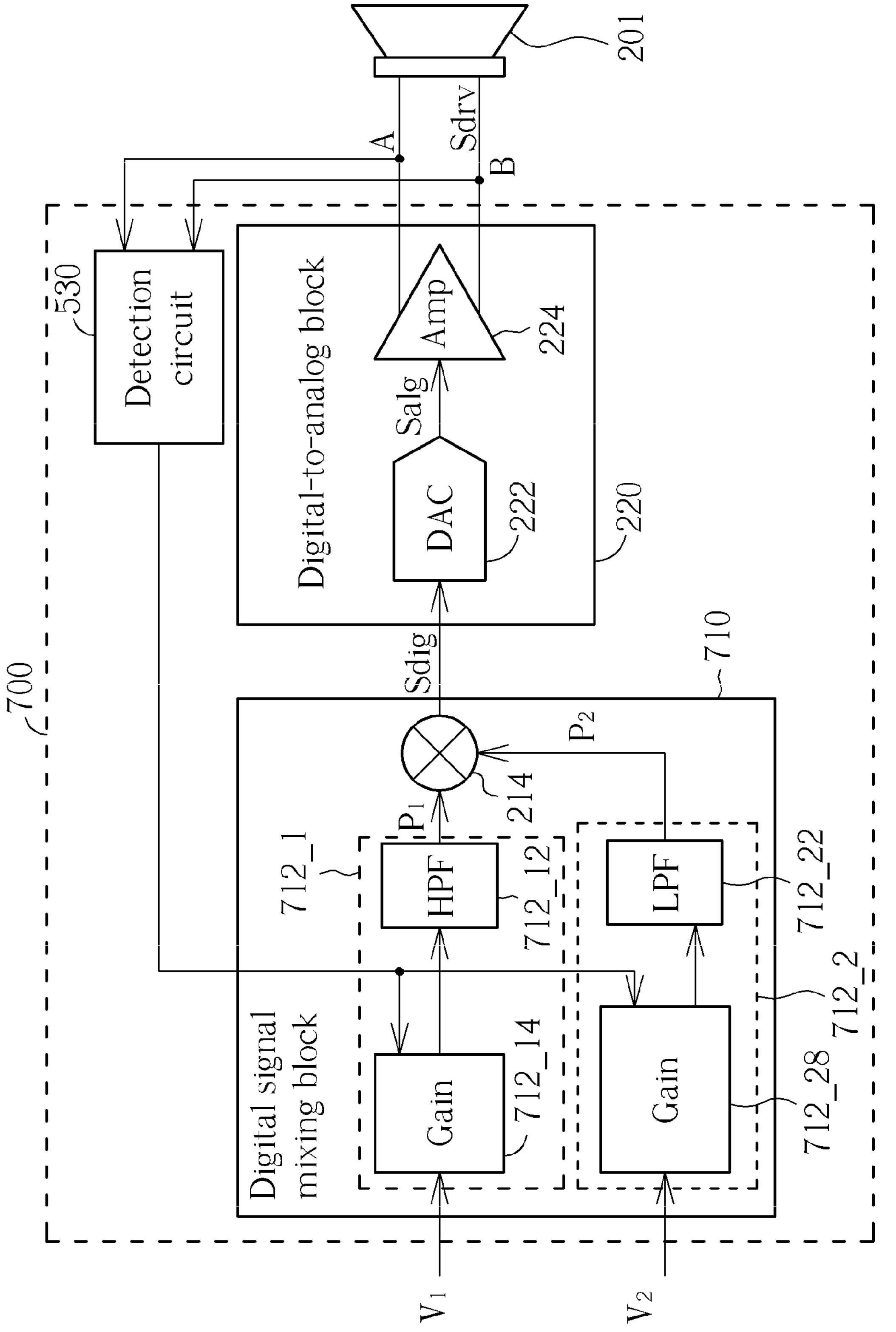
FIG. 7 is a block diagram illustrating another exemplary implementation of a control device based on the circuit structure shown in FIG. 5.

Please refer to FIG. 7, which is a block diagram illustrating another exemplary implementation of a control device based on the circuit structure shown in FIG. 5. The control device 700 is implemented for driving the multi-function speaker 201. In the example, the digital signal mixing block 710 has two signal processing blocks 712_1 and 712_2, where the signal processing block 712_1 includes a high-pass filter (HPF) 712_12 and a gain block (Gain) 712_14, and the signal processing block 712_2 includes a low-pass filter (LPF) 712_22 and a gain block (Gain) 712_28. If the detection circuit 530 detects that the actual power inputted into the multi-function speaker 201 is larger than the rated power of the multi-function speaker 201, the detection circuit 530 will send a level-down signal to the gain blocks (Gain) 712_28 and 712_14. Next, the gain blocks (Gain) 712_28 and 712_14 will pull down power levels of the audio signal $V_1$ and the vibration signal $V_2$ to protect the multi-function speaker 201.

On the other hand, if the detection circuit 530 detects that the actual power inputted into the multi-function speaker 201 is smaller than the rated power of the multi-function speaker 201, the detection circuit 530 will send a level-up signal to the gain blocks (Gain) 712_28 and 712_14. Next, the gain blocks (Gain) 712_28 and 712_14 will pull up power levels of the audio signal $V_1$ and the vibration signal $V_2$ to enhance performance of the multi-function speaker 201. Please note that, the vibration signal $V_2$/audio signal $V_1$ may be processed by the gain block (Gain) 712_28/712_14 before or after being filtered. In other words, the coupling order of the low-pass filter (LPF) 712_22 and the gain block (Gain) 712_28 is adjustable, and/or the coupling order of the high-pass filter (HPF) 712_12 and the gain block (Gain) 712_14 is adjustable.

Please note that the multi-function speaker mentioned above is not limited to a speaker supporting multiple functions selected from a group consisted of audio playback, voice playback, and vibration. To put it another way, the proposed control device may be employed for driving any multi-function speaker supporting at least an audio function and a non-audio function. Moreover, the afore-mentioned implementations of the digital signal mixing block included in the proposed control device are for illustrative purposes only. Actually, the spirit of the present invention is obeyed as long as a digital mixing scheme is employed by a control device designed for driving a multi-function speaker.

Figure 8:
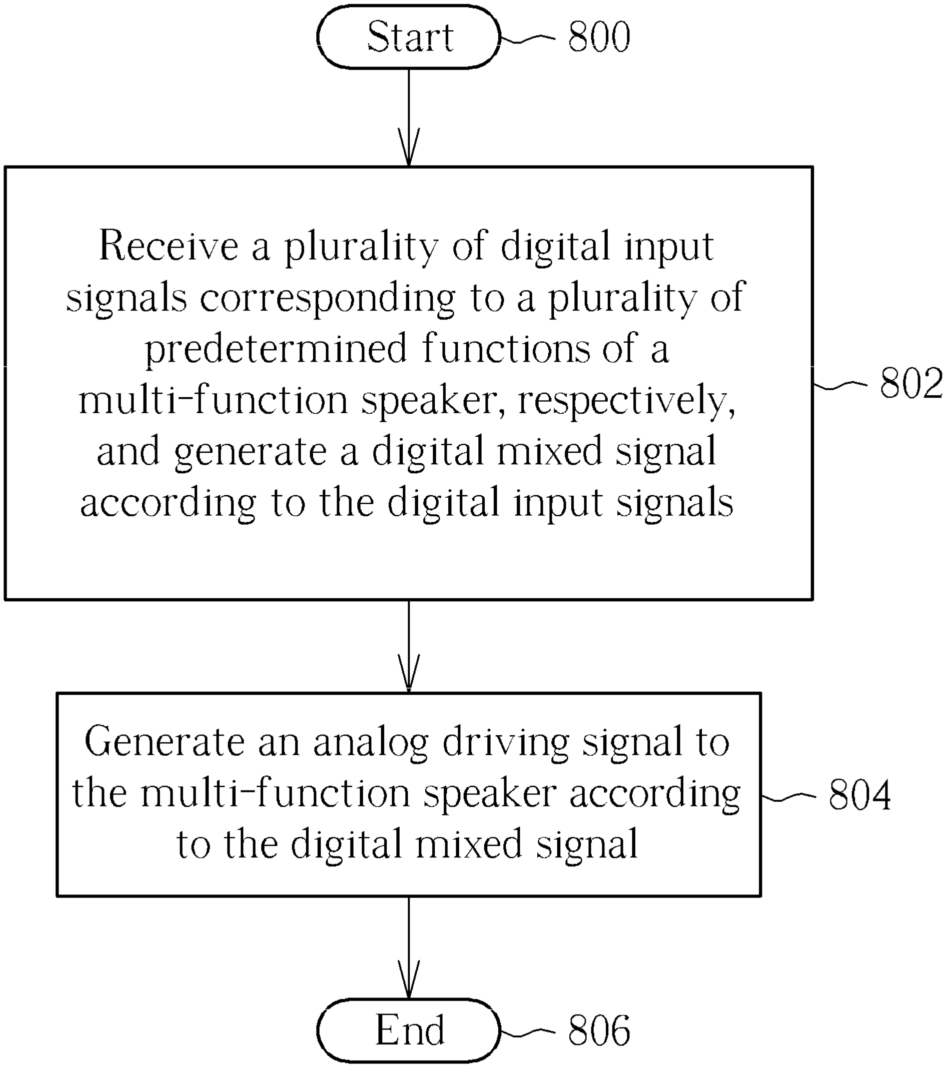
FIG. 8 is a flowchart illustrating a control method for driving a multi-function speaker according to an exemplary embodiment of the present invention.

Please refer to FIG. 8, which is a flowchart illustrating a control method for driving a multi-function speaker according to an exemplary embodiment of the present invention. Provided that the result is substantially the same, the steps are not required to be executed in the exact order shown in FIG. 8. The exemplary method may be employed by the exemplary control device 200 shown in FIG. 2, and may be briefly summarized as below.

Step 800: Start.

Step 802: Receive a plurality of digital input signals corresponding to a plurality of predetermined functions of a multi-function speaker, respectively, and generate a digital mixed signal according to the digital input signals. For example, the predetermined functions may include an audio function and a non-audio function.

Step 804: Generate an analog driving signal to the multi-function speaker according to the digital mixed signal.

Step 806: End

Step 802 may be performed by the digital signal mixing block 210 shown in FIG. 2, and step 804 may be performed by the digital-to-analog block 220 shown in FIG. 2. As a person skilled in the art can readily understand the operation of each step shown in FIG. 8 after reading above paragraphs directed to the control device 200, further description is omitted here for brevity.

Figure 9:
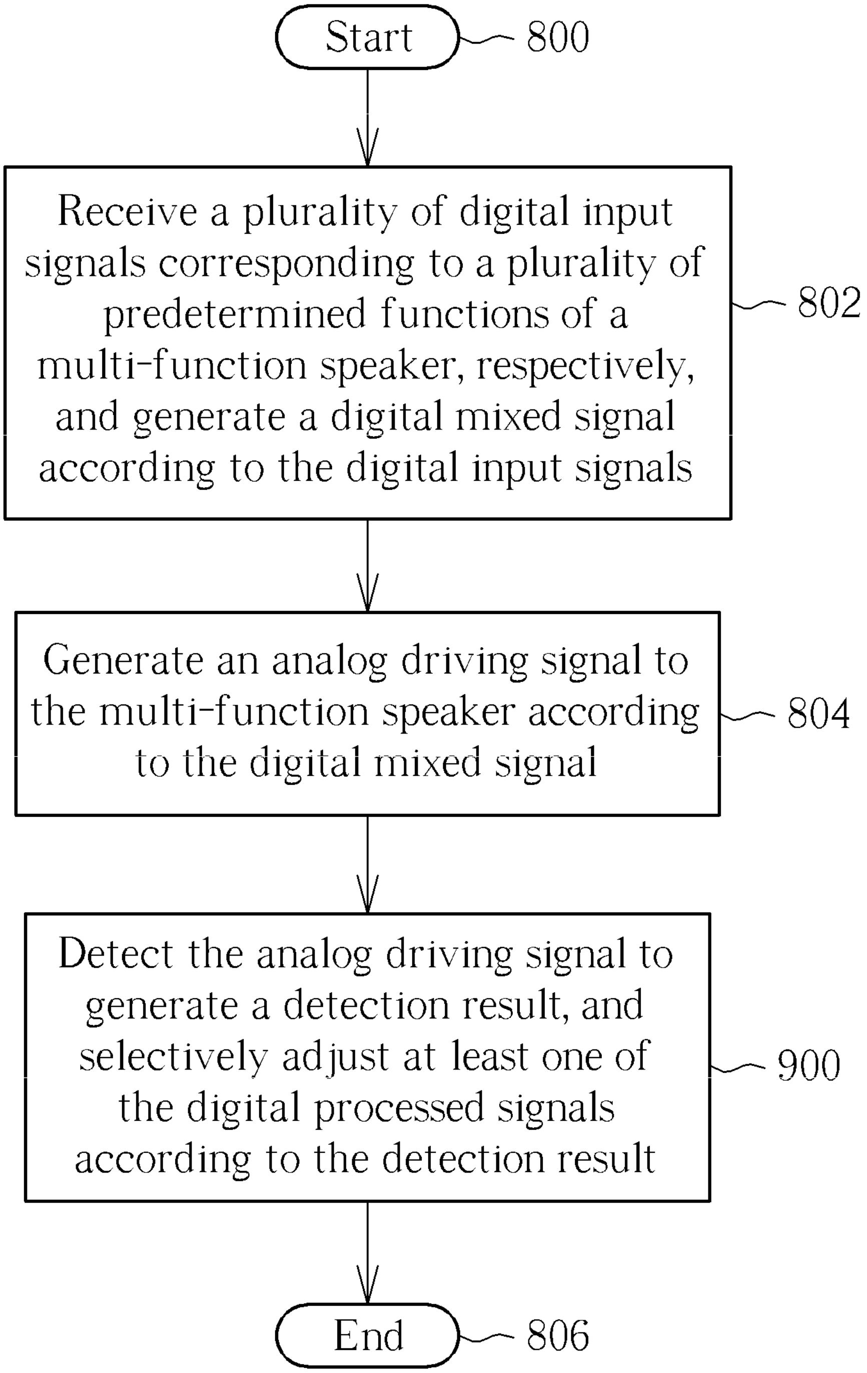
FIG. 9 is a flowchart illustrating a control method for driving a multi-function speaker according to second exemplary embodiment of the present invention

Please refer to FIG. 9, which is a flowchart illustrating a control method for driving a multi-function speaker according to second exemplary embodiment of the present invention. Provided that the result is substantially the same, the steps are not required to be executed in the exact order shown in FIG. 9. The exemplary method may be employed by the exemplary control device 500 shown in FIG. 5, and may be briefly summarized as below.

Step 800: Start.

Step 802: Receive a plurality of digital input signals corresponding to a plurality of predetermined functions of a multi-function speaker, respectively, and generate a digital mixed signal according to the digital input signals. For example, the predetermined functions may include an audio function and a non-audio function.

Step 804: Generate an analog driving signal to the multi-function speaker according to the digital mixed signal.

Step 900: Detect the analog driving signal to generate a detection result, and selectively adjust at least one of the digital processed signals according to the detection result. In a case where one or more digital processed signals are adjusted in response to the detection result, the analog driving signal generated in step 804 is adjusted correspondingly.

Step 806: End.

Step 802 may be performed by the digital signal mixing block 210 shown in FIG. 5, step 804 may be performed by the digital-to-analog block 220 shown in FIG. 5, and step 900 may be performed by the detection circuit 530 shown in FIG. 5. As a person skilled in the art can readily understand the operation of each step shown in FIG. 9 after reading above paragraphs directed to the control device 500, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control device for driving a multi-function speaker supporting a plurality of predetermined functions including at least an audio function and a non-audio function, the control device comprising:

- a digital signal mixing block, for receiving a plurality of digital input signals corresponding to the predetermined functions, respectively, and generating a digital mixed signal according to the digital input signals, wherein the digital signal mixing block comprises:
  - a plurality of signal processing blocks, for generating a plurality of digital processed signals by processing the digital input signals, respectively, wherein at least one of the signal processing blocks comprise:
    - a wideband signal generation block, for receiving and converting a narrowband vibration signal which is one of the digital input signals that corresponds to the non-audio function into a wideband signal; and
  - a mixer, for generating the digital mixed signal by mixing the digital processed signals; and
- a digital-to-analog block, coupled to the digital signal mixing block, for generating an analog driving signal to the multi-function speaker according to the digital mixed signal.

2. The control device of claim 1, wherein the signal processing blocks generate the digital processed signals matching a plurality of electronic characteristics of the multi-function speaker, and the electronic characteristics correspond to the predetermined functions, respectively.

3. The control device of claim 2, wherein the signal processing blocks control at least one of frequencies, phases, power levels, current levels or voltage levels of the digital processed signals according to the electronic characteristics of the multi-function speaker, respectively.

4. The control device of claim 1, wherein the signal processing blocks comprise:

- a high-pass filter, coupled to the mixer, for removing low-frequency components from a first signal of the digital input signals; and
- a low-pass filter, coupled to the mixer, for removing high-frequency components from a second signal of the digital input signals.

5. A control method for a multi-function speaker supporting a plurality of predetermined functions including at least an audio function and a non-audio function, the control method comprising:

- receiving a plurality of digital input signals corresponding to the predetermined functions, respectively;
- generating a digital mixed signal according to the digital input signals, comprising:
  - generating a plurality of digital processed signals by processing the digital input signals, respectively, comprising:
    - receiving and converting a narrowband vibration signal which is one of the digital input signals that corresponds to the non-audio function into a wideband signal; and
  - generating the digital mixed signal by mixing the digital processed signals; and generating an analog driving signal to the multi-function speaker according to the digital mixed signal.

6. The control method of claim 5, wherein the step of generating the digital processed signals by processing the digital input signals comprises:

generating the digital processed signals matching a plurality of electronic characteristics of the multi-function speaker, where the electronic characteristics correspond to the predetermined functions, respectively.

7. The control method of claim 6, wherein the step of generating the digital processed signals matching the electronic characteristics of the multi-function speaker comprises:

controlling at least one of frequencies, phases, power levels, current levels and voltage levels of the digital processed signals according to the electronic characteristics of the multi-function speaker, respectively.

8. The control method of claim 5, wherein the step of generating the plurality of digital processed signals by processing the digital input signals comprises:

removing low-frequency components from a first signal of the digital input signals; and removing high-frequency components from a second signal of the digital input signals.

* * * * *